(12) United States Patent
Stewart et al.

(10) Patent No.: US 9,892,282 B2
(45) Date of Patent: Feb. 13, 2018

(54) ANTI-TAMPER SYSTEM EMPLOYING AUTOMATED ANALYSIS

(75) Inventors: Neil William Stewart, Glasgow (GB); Graeme Kerr Harkness, Edinburgh (GB); Douglas McPherson Little, Glasgow (GB)

(73) Assignee: Inside Secure, Meyreuil (FR)

( * ) Notice: Subject to any disclaimer, the term of this patent is extended or adjusted under 35 U.S.C. 154(b) by 341 days.

(21) Appl. No.: 12/936,412

(22) PCT Filed: Apr. 7, 2009

(86) PCT No.: PCT/GB2009/050340
§ 371 (c)(1),
(2), (4) Date: Jan. 3, 2011

(87) PCT Pub. No.: WO2009/125220
PCT Pub. Date: Oct. 15, 2009

(65) Prior Publication Data
US 2011/0088095 A1 Apr. 14, 2011

(30) Foreign Application Priority Data

Apr. 7, 2008 (GB) .................................. 0806284.6

(51) Int. Cl.
| | |
|---|---|
| *G06F 21/14* | (2013.01) |
| *G06F 21/64* | (2013.01) |
| *G06F 21/12* | (2013.01) |
| *G06F 21/54* | (2013.01) |
| *G06F 21/56* | (2013.01) |

(52) U.S. Cl.
CPC .............. *G06F 21/64* (2013.01); *G06F 21/12* (2013.01); *G06F 21/14* (2013.01); *G06F 21/54* (2013.01); *G06F 21/565* (2013.01)

(58) Field of Classification Search
CPC .......... G06F 21/54; G06F 21/57; G06F 21/14; G06F 21/565; G06F 21/64
USPC ............................................................ 726/25
See application file for complete search history.

(56) References Cited

U.S. PATENT DOCUMENTS

| | | | |
|---|---|---|---|
| 6,049,666 A * | 4/2000 | Bennett et al. ............... 717/130 |
| 6,430,741 B1 * | 8/2002 | Mattson, Jr. ......... G06F 11/3676 |
| | | | 714/E11.209 |
| 6,668,325 B1 * | 12/2003 | Collberg ................. G06F 21/14 |
| | | | 713/194 |

(Continued)

OTHER PUBLICATIONS

International Preliminary Report on Patentability, dated Oct. 12, 2010, and Written Opinion, issued in priority International Application No. PCT/GB2009/050340.

(Continued)

*Primary Examiner* — Linglan Edwards
(74) *Attorney, Agent, or Firm* — Brake Hughes Bellermann LLP

(57) ABSTRACT

A computer implemented anti-tamper system employing runtime profiling of software in order to decide where to inject integrity checks into the software, to enable verification of whether or not the software has been tampered with. Runtime profiling and analysis is used to record information about the application, in order to establish the locations and targets of runtime integrity checks in order to optimize protection security, while minimizing the performance penalty and the need for hand configuration.

20 Claims, 1 Drawing Sheet

(56) References Cited

U.S. PATENT DOCUMENTS

| | | | |
|---|---|---|---|
| 7,051,200 B1* | 5/2006 | Manferdelli | G06F 21/10 705/57 |
| 7,512,936 B2* | 3/2009 | Schneider | G06F 21/14 704/8 |
| 7,539,875 B1* | 5/2009 | Manferdelli | G06F 21/10 380/277 |
| 7,581,103 B2* | 8/2009 | Horne | G06F 11/3624 713/176 |
| 8,375,369 B2* | 2/2013 | Mensch et al. | 717/130 |
| 8,434,064 B2* | 4/2013 | Akritidis | G06F 11/3612 717/100 |
| 8,443,354 B1* | 5/2013 | Satish et al. | 717/156 |
| 8,510,571 B1* | 8/2013 | Chang | G06F 21/54 713/187 |
| 2003/0023856 A1* | 1/2003 | Horne | G06F 11/3624 713/187 |
| 2003/0066055 A1* | 4/2003 | Spivey | G06F 11/28 717/131 |
| 2004/0205411 A1* | 10/2004 | Hong | G06F 21/566 714/38.1 |
| 2007/0033578 A1 | 2/2007 | Arnold et al. | |
| 2007/0240141 A1 | 10/2007 | Qin et al. | |
| 2007/0256138 A1* | 11/2007 | Gadea | G06F 21/125 726/26 |
| 2007/0266434 A1* | 11/2007 | Reifer | G06F 21/14 726/22 |
| 2008/0148061 A1* | 6/2008 | Jin | G06F 21/14 713/187 |
| 2008/0163375 A1* | 7/2008 | Savagaonkar | G06F 21/64 726/26 |
| 2008/0168564 A1* | 7/2008 | Lerouge et al. | 726/26 |

OTHER PUBLICATIONS

International Search Report, dated Jun. 15, 2009, issued in priority International Application No. PCT/GB2009/050340.
File history of corresponding European Application No. EP2009719198.

* cited by examiner

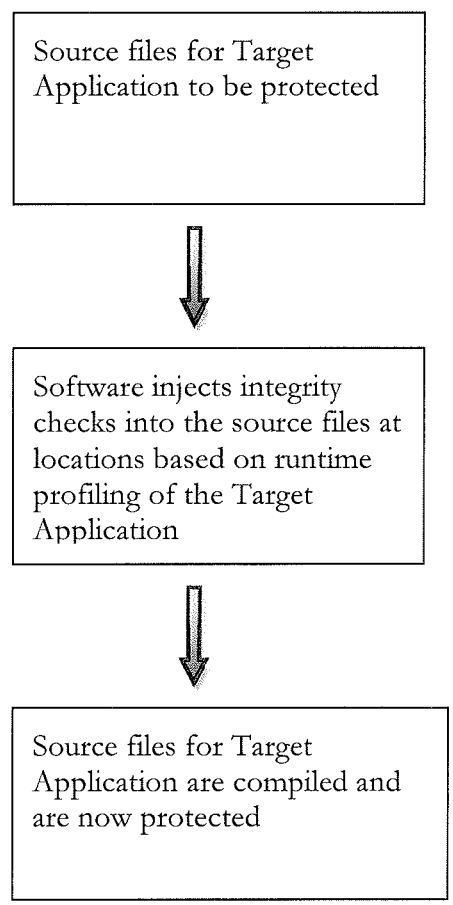

ANTI-TAMPER SYSTEM EMPLOYING AUTOMATED ANALYSIS

CROSS REFERENCE TO RELATED APPLICATIONS

This application claims the priority of PCT/GB2009/050340, filed on Apr. 7, 2009, which claims priority to Great Britain Application No. 0806284.6, filed Apr. 7, 2008, the entire contents of which are hereby incorporated in total by reference.

BACKGROUND OF THE INVENTION

1. Field of the Invention

This invention relates to an anti-tamper system, i.e. a system that makes it difficult for a hacker to modify a piece of software. The system employs a unique automated analysis in order to achieve a system of high performance and security with little user configuration or intervention 2. Description of the Prior Art The use of computer software applications is ubiquitous in modern life. They can provide fun and enjoyment to those using them, and can automate complicated procedures allowing us to do things we could not otherwise do. They can enable communication, and can aid in the dissemination and visualisation of complex information. In all of these capacities, good software is a valuable commodity for which consumers are willing to pay.

In turn, the burgeoning software industry has invested, and continues to invest, heavily in the development of such products to meet this market demand.

To protect this investment, developers and publishers insert protections into the software to ensure that only authorised persons are able to use it and that others cannot gain a competitive advantage by analysing it to obtain secrets, or by modifying it to change its behaviour.

However, there are a number of individuals (hackers) who are skilful at reverse-engineering and modifying such software. Their goals are to circumvent the inserted protections in order to, for example, remove "trial" limitations, access secret cryptographic information, and cheat in online competitions. These "hacked" versions are then distributed, usually on the internet, to potentially many thousands of users, with obvious impact on the revenues of software companies.

It is the goal of an "anti-tamper" system to prevent or at least make it very difficult for hackers to modify a piece of protected commercial software.

The methods employed by anti-tamper systems broadly fall into two main areas.

First, the code can be obfuscated. An obvious precursor to modifying a piece of software is understanding how it works—sometimes to a limited extent. A number of patents describe methods to obfuscate application code, in order to make this process of understanding difficult. It is important to note that the obfuscated code may be run in its obfuscated state or it may have to be de-obfuscated before being run, as is the case when code encryption is used. Both cases have the problem that, if a hacker can understand the obfuscation process, the protection is rendered ineffective. Determining the difficulty that the hacker has, and hence the strength of the protection system, is not easy.

The second method, and the one used in the present invention, is to verify that the application has not been tampered with, where tampering includes code and/or data modifications, changes to the execution environment, or any other measure which ultimately changes the behavior of the application. We call these points of verification 'integrity checks'.

For example, during its normal running, an application might check the integrity of its own code. A particular area of the application code might use a check summing algorithm to verify that another (target) area of code has not been modified. Through extrapolation of such a checking approach, an interconnected web of checks (a topology) can be constructed. The intention being that any modification to the application code will be detected and defensive action can be taken. These code integrity checks can be injected into an existing program either manually or automatically.

Chris Crawford released a paper into the public domain that described using checksums to empower a self-checking system to prevent hacking. He had previously employed this system in 1990 to protect Patton Strikes Back, and may have used earlier to protect Trust and Betrayal in 1988. Although the original paper is difficult to find, Crawford describes the self-checking system used in Patton Strikes Back in his 2003 book, "Chris Crawford on Game Design", which makes explicit mention of checks which check each other to form a large "web of checks", a core concept used by all self-checking protection systems since then. Crawford also describes the use of variance to disguise checks and any responses.

There have been a number of published variants of this basic approach.

Another form of integrity check involves using techniques which can reveal the presence of debugging/hacking tools, or even frustrate their use such that a hacker cannot easily deploy such tools against a protected program. This type of integrity check is typically called an anti-debug measure. These can also be injected into an existing program either manually or automatically.

There are significant problems in such approaches which we address with our approach by the introduction of a new paradigm and technology.

Since the integrity checking is being performed at runtime, there are possible performance penalties for the protected application: checks run at an inappropriate time can lead to a poor user experience. To minimise this risk, developers tend to add a small number of such checks. In turn, this leads to less protective strength; it is easier for hackers to discover, understand, and remove all the checks. Furthermore, no code self-checking scheme devised so far addresses the problem of when checks are performed compared to when the checked code is executed. If this is left to chance, it may be extremely easy for a hacker to modify the code he/she desires, have it execute, and then return it to its original state.

Balancing the related aspects of number of checks, their runtime performance, and the resulting protection strength is therefore key to a successful application of an integrity verifying protection scheme particularly if little user intervention is required. Furthermore, it is essential that the scheme take into account the runtime sequence of application code execution.

SUMMARY OF THE PRESENT INVENTION

The present invention provides, a computer implemented anti-tamper system employing runtime profiling of software in order to decide where to inject integrity checks into the software to enable verification of whether or not the software has been tampered with. In addition, how much work each check should do may be decided; where to put the different checks can be based on how much work each check should do and the type of check deployed at a given location.

In one implementation, there is a method to use runtime profiling and analysis to record information about the application, in order to establish the locations, targets and allowed effort of runtime integrity checks in order to optimise protection security, while minimising the performance penalty and the need for hand configuration. The invention provides, in a further implementation, methods of profiling and information gathering, and the use of this information, which improve the efficacy of the invention on real applications.

Other aspects of the invention include:
- a method of modifying software to enable the integrity of the software to be checked, comprising the step of runtime profiling the software in order to decide where to inject integrity checks into the software,
- a computer program stored on a computer readable medium, the program including integrity checks injected using the system or the methods described above.
- a computer program stored on a computer readable medium, the program operable to employ runtime profiling of software in order to decide where to inject integrity checks into the software.

BRIEF DESCRIPTION OF THE DRAWING

The invention is schematically shown in FIG. 1

DETAILED DESCRIPTION

In the context of an anti-tamper scheme that performs integrity checks at runtime, the present invention describes a method to automate the insertion of checking code, to determine optimized positions for the location of the code, to better decide which area of application memory could be checked, to determine the amount of work each check should do, and to optimize various other configurable parameters in the checking process.

The present invention is a three-stage process:
- Firstly, the original unprotected application is profiled at runtime to provide timing and/or structural information about the application. A program can be profiled without instrumenting it or modifying it in any way, e.g. a sampling-based profiler could be used; instrumenting is also possible. The information recorded need not be detailed or contain structural information, although recording such can (and does) afford better results.
- Secondly, this information is processed to make decisions about the checks to be inserted.
- Thirdly, the checks are inserted into the application in order to generate a final, protected version that is resistant to tampering by hackers.

This is shown schematically in FIG. 1. The preferred embodiment works with the source code for the application to be protected. In this embodiment, the profiling at the first stage is implemented through automated instrumenting modifications to the application source code, and compiling the code in the standard way. Data is then collected by running the instrumented application. Similarly, the third stage re-modifies the application source code in order to inject the necessary checks, the protected application itself being the result of compiling the code using standard techniques.

A person experienced and knowledgeable in the art would immediately see further applications of the present invention such as but not limited to the case where an assembly language version of the application code is modified, or the application's object code itself or, in the case of the profiling element, without any code modifications at all.

The goal of the profiling at the first stage above, and the subsequent running of the target application, is to gather data about the layout, structure, and timing of its various components. Note that not all of these are needed for basic operation, as mentioned earlier.

In the preferred embodiment, key to the process of instrumenting the application to capture this data is a pre-instrumentation static analysis, in which the application's functions are enumerated. This means that profiling tables can be allocated statically and, at runtime, all data is updated by direct table access. Both of these reduce the performance impact on the target application, so as not to affect the collected data.

The method gathers several types of information:
- Basic profiling information, such as function execution counts, execution times, total program runtime, and so on.
- Call-graph data captures which application functions are called by which others. It records how many times this calling process occurs, when it occurs, and how long each function takes to execute, both by itself and including the execution time of the functions it calls. This allows the complete application call-graph to be reconstructed.
- Execution-graph data captures the execution order of functions. This provides critical information for the assigning of targets to checks.
- Frequency-domain data captures the temporal frequencies at which any given function is called, and when in the application's execution each frequency occurs. For example, at one part of the program's execution, a particular function may be called many times, and very frequently. Later in the application's lifetime, it may never be called again. Such information is vital for establishing an efficient, and secure, checking web and is not generally captured by off-the-shelf profiler applications.

When combined, these pieces of information allow us to place checks in the strongest possible positions with the smallest possible performance impact. Furthermore, the system is easy to use for the software developer, requiring no specialist security knowledge.

For example, a function which is called 2000 times in a 1 minute run of an application could be interpreted as a medium-frequency function as it is called roughly once per $1/30^{th}$ of a second and thus a reasonable place to inject a check.

However, it may be that this particular function was called 2000 times in the first second after the application started, and then never called again, making it a high-frequency, but short-lived function.

Injecting a check into this function or ones like it could noticeably impact startup time of the application and would be undesirable. Similarly, injecting checks into interactive, time-sensitive parts of an application based on incomplete information may introduce performance spikes which are very noticeable to the user of the application.

To solve this, our injection system uses the frequency-domain information we record to determine that this function is indeed a high-frequency, short-lived function, and act accordingly.

Furthermore, our injection system uses this frequency-domain information to establish a confidence metric as to the temporal stability of any given function. If a function is seen to execute at a large number of different frequencies during profiling, it is considered to be temporally unstable and we assume that it is likely to execute at other, unknown (possibly very high) frequencies in future runs of the application, thus making it a bad injection target, since it may lead to performance spikes, or simply poor overall performance. We typically avoid injection into such functions while more stable alternatives are available.

This mechanism naturally increases the number of checks we can inject safely, since the possibility of a performance-reducing—or spike-introducing—injection is significantly reduced. Without such a mechanism, users would typically have to "dial back" the number of checks in order to avoid bad injections, ultimately limiting the number of checks that can be injected. This severely limits the strength of applied protection by several orders of magnitude.

Our injection system also uses the profiling data to decide what form any given check should take, primarily from a performance perspective; more expensive checks will tend to be injected into less frequently-called functions and vice versa. In general, by aligning the performance characteristics of checks with the profile data associated with the functions they are injected into, we can inject more checks into an application without introducing a noticeable performance impact than would otherwise be possible. It is also worth noting that this alignment is deliberately imperfect in most cases, since it is undesirable for an anti-tamper system to make injection decisions which might be significantly derived by a hacker looking at a protected application's performance profile.

In the case of code self-checks, the cost of a check primarily depends on the amount of code being checked and the checksum algorithm (or other integrity-checking algorithm) used to perform the check, although other characteristics (such as the type and speed of the memory being accessed) may also be important in some circumstances.

It is also worth noting that our system can also employ cost-reducing measures on code self-checks such as incremental checks and periodic checks, which can be used in more frequently called functions to further increase the number of checks we can deploy without significantly impacting performance.

In the case of anti-debug checks, the cost of a check is typically unique to each anti-debug technique being injected. Some anti-debug checks can involve triggering quite expensive exception mechanisms in the operating system or CPU, whereas others might only involve a small number of inexpensive operations.

Other forms of integrity check are treated similarly, where each check is assessed for runtime cost and this cost is generally aligned with the profile data for the application.

The invention primarily provides improved protection strength by maximising the number of checks, and the amount of checking work that they do, for any given level of performance impact. In general, more checks (and thus more checking activity) means a hacker has to undertake more work in order to neutralise the protection, which is a useful real-world measure of protection strength.

The invention also provides improved protection by other means including, but not limited to: ensuring that code is generally checked quite soon before and after it is executed; ensuring that interdependent checks are generally executed near each other in the application's execution profile; and ensuring that multiple checks with the same target, type or mode of operation are generally separated in time, space and frequency with a normal random distribution. Due to the mutually exclusive nature of certain of these goals, the importance of each goal is also distributed amongst the checks, such that all goals can be met to a reasonable extent.

Achieving these protection strength-improving goals is made possible through the use of the call-graph, execution-graph and frequency-domain profiling information we record for the application being protected. For example, we can ensure that code is checked before and after it is executed because the call-graph and execution-graph allow us to determine when functions in the application are generally executed with respect to each other. Similarly, we can ensure that interdependent checks are generally executed near each other in time by using the same call-graph and execution-graph data, or by using the frequency-domain data, which provides us with a coarse indication as to when each function executes at each call frequency. This same data is also used to maximise the distribution of checks with the same target, type or mode of operation in time and space.

By checking code before and after it is executed, we reduce the window of opportunity for a hacker to modify a piece of code, allow it to execute, and then replace the original code, such that the self-checking mechanism does not detect the temporary change, to as small a period of time as possible, thus maximising the effectiveness of the self-checking system at any given point in time.

By arranging interdependent checks such that they generally execute near each other in time, we ensure that applications which contain significant sections of code which are executed in relative isolation from other significant sections of code, do not suffer from reduced protection strength due to too many checks covering code which is generally executed at quite different times to the code containing the checks.

By distributing checks with the same target, type or mode of operation in time and space, we generally ensure that a hacker has to expend more effort to find and exploit patterns in the protection scheme. This goal is also used to temper the previous two goals, since both of them can result in poor distribution if allowed to operate by themselves.

In one implementation of the invention, we combine all of the optimising goals thus described using a greedy algorithm, where the best decision for placement of a check, the form of the check, the target of the check (if applicable) and the amount of work done by the check is made at each stage with respect to the check topology built thus far and all of the goals we have described in terms of maximising performance and protection strength. In another implementation of the invention, an alternative optimisation process may be used, including but not limited to: a brute force search of all possible check topologies; or using a genetic algorithm to determine a check topology with the best fitness according to the goals set out here.

In one implementation of the present invention as a software tool, the software is used as follows:
1. The software is installed onto a computer system which is used to develop other software applications.
2. The software is manually or automatically set up to intercept the compilation process, such that all source files being compiled are passed through the software, and transformed by the software to inject either profiling instrumentations or protection code, before being passed to the compiler proper, and furthermore that the software is allowed to operate upon the final program after compilation has occurred.
3. The application being protected is compiled such that all source files are passed through the software, and the software is set to "analysis mode", which injects profiling instrumentations into the application.
4. The instrumented application is executed in order for the profiling instrumentations to gather at runtime the information required to make effective decisions when the protection code is subsequently injected.
5. During execution, the application is "exercised" either by a human user or through the use of automated tests, in order to expose the profiling instrumentations to as much application code as possible.
6. The application is compiled again, this time with the software set to "protection mode", which injects protection code into the application, making decisions according to the profiling data gathered in the preceding stages. The nature and location of each piece of protection code is recorded for use by the next stage.
7. After compilation, the software modifies the final program binary using the recorded protection information from the preceding stage, in order to finalise certain aspects of the protection that cannot be done at the source code level or during compilation. For example, code checksums need to be calculated on the final code, so this is done as a final process on the binary itself.
8. The resulting program binary is protected.

Summary of key features of implementations of the present invention are:
  A profiling system that is used for two key purposes:
  Deciding where to inject integrity checks, and how much work each check should do, to minimise performance impact on underlying program; and
  Deciding where to inject integrity checks to maximise protection against tampering.

A Profiler may be used that is designed to minimise impact on program performance. This may be critical for achieving accurate timing information, particularly when asynchronous communication and/or hardware are involved.

The injection policy can be designed to make strategic decisions about the impact on program performance and on protection against tampering in an automated way. That is, to make the protection easy to use and apply without requiring the intervention of the software developer or expert security knowledge.
  Source analysis allows functions to be enumerated.
  Allows profiling tables to be pre-allocated, minimising performance impact.
  Each profile point uses direct table access, further minimising performance impact.
  The system may use several types of recording:
  Basic profiling information, such as function execution counts, execution times, total program runtime, and so on.
  Call-graph—Records which functions are called by any given function, and how often.
  Frequency-domain timings—Records frequencies at which each function is called, and during which time range each frequency occurs.
  Execution-graph—Records which function was executed prior to any given function.
  Call-graph recording may use a static table and a stack of entered functions.
    Static table is 2D table indexed by function and calling (parent) function. Parent function index is obtained from current stack top.
    Table records entry counts for each parent-child pair.
    Entire call-graph can be statistically re-constructed by following parent-child paths in table.
    This scheme provides the best trade-off between information content and cost of recording.
  Frequency-domain recording may use a static table.
    Static table is a 2D table indexed by function and frequency.
    Table holds start and end time of frequency occurrence in program for each function.
    Frequency indices are log 2 to provide trade-off between accuracy and table size.
    Table queries can blend adjacent frequency slots to simplify handling of border cases, where a function's call frequency straddles two slots.
  Execution-graph recording may use a static table.
    Similar to call-graph recording, a 2D table indexed by current function and previous function. Previous function is stored as a single value (rather than a stack as for the call-graph).
    Table records entry counts for each previous-current pair of functions.
    Entire execution-graph can be statistically re-constructed by following previous-current function paths in table.
    This scheme provides the best trade-off between information content and cost of recording.
  Frequency-domain information may be used to determine best injection points for self-checking code.
    Lower-frequency functions are good candidates to minimise performance overhead.
    Higher-frequency functions are good candidates to maximise level of checking being performed.
    Trade-off between lower- and higher-frequency functions allows a practical balance between low performance overhead and strong protection.
    Considering the frequency range of any given function over time allows anomalous frequency behaviours to be avoided or compensated for.
      When considering performance overhead, use the highest frequency that occurs for each function (unless that frequency occurs for a very short period).
      When considering level of checking, use the mean or median frequency that occurs for each function.
  Call-graph and execution-graph information may be used to guide self-checking topology.
    Each zone is checked by a number of other functions. Ideally, we place at least one such check in a function that executes just before the code in the zone, and one in a function that executes just after the code in the zone.
    Parent functions in a call-graph are considered valid before and after functions for any functions they call.

Although we have described runtime profiling of software in order to decide where to inject integrity checks into the software, the principle of profiling software can be used to guide any form of program-transforming injection. Injecting anti-tamper protection code is therefore only one example of injecting code into an existing application. Other systems which rely on such injections have performance impacts which could be reduced by using this approach. Hence, this invention can be extended to profiling software to guide any form of program-transforming injection.

The invention claimed is:
1. A non-transitory computer-readable medium having instruction stored thereon, the instructions, when executed by a processor, cause the processor to:
  determine, using profile recordings stored in a memory and obtained by runtime profiling a first executable software stored in the memory, injection positions where to inject integrity check code sections into uncompiled source files stored in the memory and corresponding to the first executable software, inject integrity check code sections at the determined injection positions into the uncompiled source files stored in the memory, and generate a second executable software in the memory, the second executable software including the integrity check code sections from the uncompiled source files, each of the integrity check code sections verifying, at runtime, whether the second executable software has been tampered with, wherein the profile recordings include frequency-domain information recording frequencies at which each function of the first executable software is called, and during which time range each frequency occurs, the determining the injection positions including:

selecting an injection position in a lower-frequency function to reduce performance overhead of the second executable software;

selecting an injection position in a higher-frequency function to increase a protection level of the second executable software; and detecting unstable functions based on the frequencies and time ranges recorded for the functions and rejecting an injection position in an unstable function.

2. The non-transitory computer-readable medium-of claim 1, wherein the instructions, when executed by the processor, further cause the processor to determine the injection positions in order to minimize performance impact on the second executable software.

3. The non-transitory computer-readable medium of claim 1, wherein the instructions, when executed by the processor, further cause the processor to determine the injection positions to maximize protection against tampering of the second executable software.

4. The non-transitory computer-readable medium of claim 1, wherein the instructions, when executed by the processor, further cause the processor to determine an amount of work to be performed by each integrity check.

5. The non-transitory computer-readable medium of claim 1, wherein the instructions, when executed by the processor, further cause the processor to:

profile, at runtime, the first executable software to provide in the memory at least one of timing information and structural information about the first executable software; and process the at least one of the timing information and the structural information in the memory to make decisions about the integrity check code sections to be inserted.

6. The non-transitory computer-readable medium of claim 5, wherein the profiling of the first executable software includes gathering data about one or more of layout, structure, and timing of components of the first executable software.

7. The non-transitory computer-readable medium of claim 1, wherein the instructions, when executed by the processor, further cause the processor to use an injection policy designed to automatically make decisions about impact on performance and impact on protection against tampering of the second executable software.

8. The non-transitory computer-readable medium of claim 1, wherein the instructions, when executed by the processor, further cause the processor to use one or more types of profile recording selected from:

basic profiling information, including at least one of function execution counts, function execution times, and total runtime of the first executable software;

call-graph information recording which functions are called by any given function of the first executable software, and how often; and execution-graph information recording which function of the first executable software was executed prior to any given function of the first executable software.

9. The non-transitory computer-readable medium of claim 8, wherein the call-graph information includes a table and a stack of entered functions.

10. The non-transitory computer-readable medium of claim 9, wherein the table is a 2D table including pairs of a parent function and a child function, indexed by function, the parent function of each of the pairs calling the child function of the pair, the table recording entry counts for each pair, and the call-graph being statistically re-constructed by following parent-child paths in the table.

11. The non-transitory computer-readable medium of claim 8 wherein the frequency-domain information comprises a 2D table indexed by function indices and frequency indices referencing frequency slots, the 2D table storing start and end time of frequency occurrence in program for each function, a table query blending adjacent frequency slots when a function's call frequency straddles two frequency slots.

12. The non-transitory computer-readable medium of claim 8, wherein the execution-graph information comprises a 2D table indexed by current function and previous function, the 2D table storing each of previous functions as a single value, the 2D table recording entry counts for each of previous-current pair of functions recorded in the table, the execution graph being statistically re-constructed by following previous-current function paths in the table.

13. The non-transitory computer-readable medium of claim 1, wherein the instructions, when executed by the processor, further cause the processor to use frequency domain information stored in the memory to classify a function of the first executable software as:

a lower-frequency function by using a highest frequency that occurs for this function, unless that highest frequency occurs for a time period that is less than a period threshold value; or a higher-frequency function by using a mean or median frequency that occurs for this function.

14. The non-transitory computer-readable medium of claim 1, wherein the instructions, when executed by the processor, further cause the processor to:

inject integrity check code sections that check integrity of a code zone of the second executable software in a first code section that executes before the code zone, and in a second code section that executes after the code zone.

15. The non-transitory computer-readable medium of claim 1, wherein the instructions, when executed by the processor, further cause the processor to minimize impact on performance of the first executable software by achieving accurate timing information for at least one of asynchronous communication or hardware.

16. The non-transitory computer-readable medium of claim 1, wherein the instructions, when executed by the processor, further cause the processor to analyze uncompiled source files stored in the memory and corresponding to the first executable software for enumerating functions.

17. The non-transitory computer-readable medium of claim 16, wherein the instructions, when executed by the processor, further cause the processor to use, when runtime profiling the first executable software, profiling tables stored in the memory, the profiling tables being pre-allocated and having direct access to minimize impact of the runtime profiling of the first executable software on performance of the first executable software.

18. A non-transitory computer-readable medium having instruction stored thereon, the instructions, when executed by a processor, result in:

runtime profiling a first executable software and storing profile recordings, determining, using the profile recordings, injection positions where to inject integrity check code sections into uncompiled source files corresponding to the first executable software, injecting integrity check code sections at the determined injection positions into the uncompiled source files, and generating, from the uncompiled source files, a second executable software including the check code sections, each of the integrity check code sections verifying at runtime integrity of at least a part of the second executable software, wherein the profile recordings include frequency-domain information recording frequencies at which each function of the first executable software is called, and during which time range each frequency occurs, the instructions, when executed by the processor, further result in:

selecting an injection position in a lower-frequency function to reduce performance overhead of the second executable software;

selecting an injection position in a higher-frequency function to increase a protection level of the second executable software; and detecting unstable functions based on the frequencies and time ranges recorded for the functions and rejecting an injection position in an unstable function.

19. A software anti-tamper system including a memory and one or more processors, the memory having instructions stored therein that, when executed by one or more processors, result in:

determining, using profile recordings obtained by runtime profiling a first executable software, injection positions where to inject integrity check code sections into uncompiled source files corresponding to the first executable software, injecting integrity check code sections at the determined injection positions into the uncompiled source files, and generating a second executable software including the integrity check code sections from the uncompiled source files, each of the integrity check code sections verifying, at runtime, whether the second executable software has been tampered with, wherein the profile recordings include frequency-domain information recording frequencies at which each function of the first executable software is called, and during which time range each frequency occurs, the determining the injection positions including:

selecting an injection position in a lower-frequency function to reduce performance overhead of the second executable software;

selecting an injection position in a higher-frequency function to increase a protection level of the second executable software; and detecting unstable functions based on the frequencies and time ranges recorded for the functions and rejecting an injection position in an unstable function.

20. A software anti-tamper system including a memory and one or more processors, the memory having instructions stored therein that, when executed by the one or more processors, result in:

runtime profiling a first executable software and storing profile recordings, determining, using the profile recordings, injection positions where to inject integrity check code sections into uncompiled source files corresponding to the first executable software, injecting integrity check code sections at the determined injection positions into the uncompiled source files, and generating a second executable software including the integrity check code sections from the uncompiled source files, each of the integrity check code sections verifying, at runtime, whether the second executable software has been tampered with, wherein the profile recordings include frequency-domain information recording frequencies at which each function of the first executable software is called, and during which time range each frequency occurs, the instructions, when executed by the one or more processors, further result in:

selecting an injection position in a lower-frequency function to reduce performance overhead of the second executable software;

selecting an injection position in a higher-frequency function to increase a protection level of the second executable software; and detecting unstable functions based on the frequencies and time ranges recorded for the functions and rejecting an injection position in an unstable function.

* * * * *

UNITED STATES PATENT AND TRADEMARK OFFICE
CERTIFICATE OF CORRECTION

PATENT NO. : 9,892,282 B2
APPLICATION NO. : 12/936412
DATED : February 13, 2018
INVENTOR(S) : Stewart et al.

It is certified that error appears in the above-identified patent and that said Letters Patent is hereby corrected as shown below:

In the Claims

In Column 9, Line 28, Claim 2, delete "medium-of" and insert -- medium of --, therefor.

In Column 10, Line 21, Claim 11, delete "8" and insert -- 8, --, therefor.

In Column 10, Lines 38-39, Claim 12, delete "frequency domain" and insert -- frequency-domain --, therefor.

Signed and Sealed this
Twenty-second Day of May, 2018

Andrei Iancu
*Director of the United States Patent and Trademark Office*